US009973053B2

United States Patent
Nakazumi et al.

(10) Patent No.: US 9,973,053 B2
(45) Date of Patent: May 15, 2018

(54) ELECTRIC MOTOR HAVING SEALED CASING AND MANUFACTURING METHOD THEREOF

(71) Applicant: KOBELCO CONSTRUCTION MACHINERY CO., LTD., Hiroshima-shi (JP)

(72) Inventors: Akira Nakazumi, Hiroshima (JP); Seiji Saiki, Hiroshima (JP); Kazushige Koiwai, Hiroshima (JP); Yoshiki Karata, Hiroshima (JP); Yoichiro Yamazaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 719 days.

(21) Appl. No.: 14/399,061

(22) PCT Filed: Apr. 4, 2013

(86) PCT No.: PCT/JP2013/002350
§ 371 (c)(1),
(2) Date: Nov. 5, 2014

(87) PCT Pub. No.: WO2013/171961
PCT Pub. Date: Nov. 21, 2013

(65) Prior Publication Data
US 2015/0108859 A1    Apr. 23, 2015

(30) Foreign Application Priority Data

May 16, 2012   (JP) .................................. 2012-112302

(51) Int. Cl.
*H02K 3/38*    (2006.01)
*H02K 3/44*    (2006.01)
(Continued)

(52) U.S. Cl.
CPC ................. *H02K 3/44* (2013.01); *H02K 3/32* (2013.01); *H02K 3/38* (2013.01); *H02K 5/08* (2013.01);
(Continued)

(58) Field of Classification Search
CPC .. H02K 3/30; H02K 3/32; H02K 3/38; H02K 3/44; H02K 5/00; H02K 5/08; H02K 5/10; H02K 5/225; H02K 15/12; H02K 15/14
(Continued)

(56) References Cited

U.S. PATENT DOCUMENTS 1,799,071 A * 3/1931 Smith ...................... H02K 9/24
310/410
3,308,316 A   3/1967 Pfahl
(Continued)

FOREIGN PATENT DOCUMENTS

CN    201133938 Y    10/2008
JP    60-96147 A     5/1985
(Continued)

OTHER PUBLICATIONS

Extended European Search Report dated Feb. 16, 2016 in Patent Application No. 13791252.3.
(Continued)

*Primary Examiner* — John K Kim
*Assistant Examiner* — Minki Chang
(74) *Attorney, Agent, or Firm* — Oblon, McClelland, Maier & Neustadt, L.L.P.

(57) ABSTRACT

Provided are, an electric motor assembly capable of preventing a sealant from leakage through a lead-wire drawing portion, and an electric motor manufacturing method with use of the electric motor assembly. The electric motor assembly includes a rotor, a stator, a casing, a partition wall
(Continued)

with through-holes, plugs made of a highly elastic material and including a tapered outer peripheral surface to be fitted into the through-holes, and lead wires connected to the stator. The plugs surround lead-wire insertion holes. A sealant is injected into the casing in a state that the lead wires are drawn through the lead-wire insertion holes. The injection pressure presses the plugs outwardly to bring the outer peripheral surfaces of the plugs into close contact with the inner peripheral surface surrounding the through-holes and elastically deforms the plugs in a diameter-reduction direction to cause the plugs to close the lead-wire insertion holes.

5 Claims, 4 Drawing Sheets

(51) Int. Cl.
    *H02K 5/10*     (2006.01)
    *H02K 5/22*     (2006.01)
    *H02K 15/12*     (2006.01)
    *H02K 3/32*     (2006.01)
    *H02K 5/08*     (2006.01)
    *H02K 15/10*     (2006.01)

(52) U.S. Cl.
    CPC ............... *H02K 5/10* (2013.01); *H02K 5/225* (2013.01); *H02K 15/105* (2013.01); *H02K 15/12* (2013.01)

(58) Field of Classification Search
    USPC ........ 310/43, 44, 45, 52, 54, 71, 87, 88, 89, 310/254.1; 29/596; 264/272.11, 272.19, 264/272.2
    See application file for complete search history.

(56) References Cited

U.S. PATENT DOCUMENTS

| | | | | |
|---|---|---|---|---|
| 3,638,055 A | * | 1/1972 | Zimmermann | ........ H02K 5/128 264/272.19 |
| 4,549,105 A | * | 10/1985 | Yamamoto | ......... B22D 11/0401 310/43 |
| 5,095,612 A | * | 3/1992 | McAvena | .................. H02K 5/10 264/272.2 |
| 5,334,897 A | * | 8/1994 | Ineson | ..................... H02K 5/08 310/401 |
| 5,889,343 A | * | 3/1999 | Bryant | ................... H02K 5/225 174/653 |
| 5,986,374 A | | 11/1999 | Kawakami | |
| 6,011,339 A | | 1/2000 | Kawakami | |
| 6,608,414 B1 | * | 8/2003 | Conley | .................. H02K 5/225 277/602 |
| 7,042,124 B2 | * | 5/2006 | Puterbaugh | .............. H02K 5/10 310/43 |
| 7,804,212 B2 | * | 9/2010 | Moody | ..................... H02K 5/10 310/88 |
| 2002/0043881 A1 | | 4/2002 | Asao et al. | |
| 2005/0074548 A1 | | 4/2005 | Puterbaugh et al. | |

FOREIGN PATENT DOCUMENTS

| | | | | |
|---|---|---|---|---|
| JP | 2002-125337 A | | 4/2002 | |
| JP | 2002-165405 A | | 6/2002 | |
| JP | 2008-193764 A | | 8/2008 | |
| JP | 2010-279228 A | | 12/2010 | |
| WO | WO 97/26700 A1 | | 7/1997 | |
| WO | WO 2005/041390 A1 | | 5/2005 | |
| WO | WO 2012044895 A1 | * | 4/2012 | ......... H01R 13/5208 |

OTHER PUBLICATIONS

International Search Report dated Jul. 9, 2013 in PCT/JP2013/002350 filed Apr. 4, 2013.

Combined Chinese Office Action and Search Report dated Apr. 1, 2016 in Patent Application No. 201380025485.3 (with English summary and English language translation of categories of cited documents).

* cited by examiner

ELECTRIC MOTOR HAVING SEALED CASING AND MANUFACTURING METHOD THEREOF

TECHNICAL FIELD

The present invention relates to an electric motor assembly provided with a stator including coil ends and allowed to be molded with a sealant so as to entirely or partially seal the stator, and to an electric motor manufacturing method with use of the electric motor assembly.

BACKGROUND ART

Figure 6:
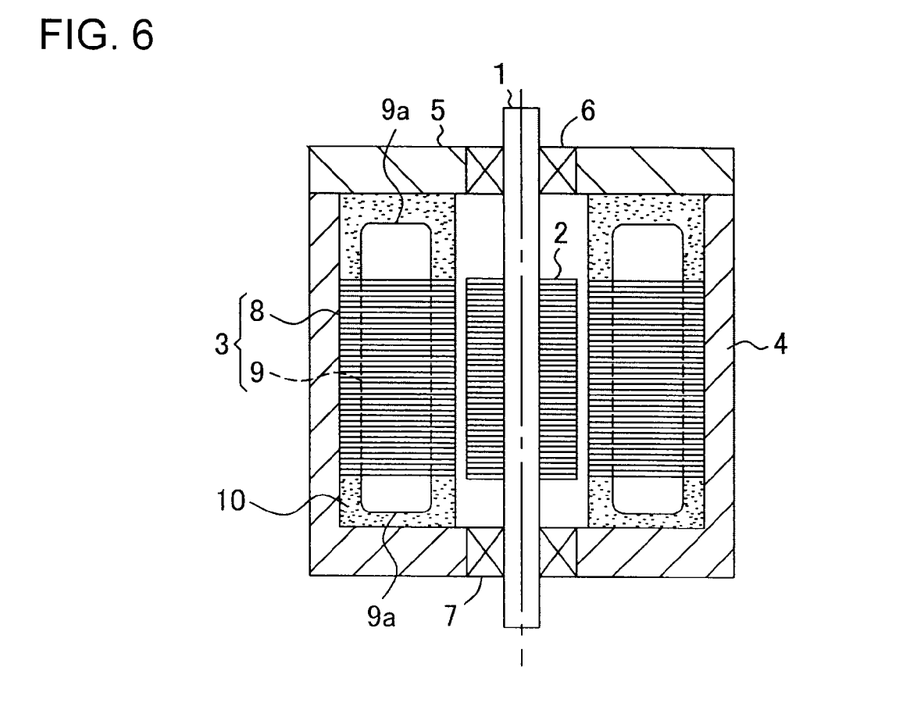
FIG. 6 is a cross-sectional view of a conventional electric motor.

FIG. 6 illustrates a conventional electric motor. The electric motor includes an electric motor shaft 1, a rotor 2 which is rotated about the electric motor shaft 1, a stator 3 disposed around the rotor 2, a casing 4 which accommodates the rotor 2 and the stator 3, and a cover 5 to be mounted on one axial end of the casing 4. The electric motor is installed in such a vertical posture that the electric motor shaft 1 extends vertically, such as a slewing electric motor for an excavator. In the following, the conventional art shown in FIG. 6 and the embodiments of the invention to be described later are explained based on the premise that the electric motor is installed in the above posture and the electric-motor axial direction is vertical. Besides, the term "electric motor" in the present specification includes a generator and a generator-motor based on the same principle as applied to an electric motor in the narrow sense, in addition to the electric motor in the narrow sense.

The cover 5 is mounted on the upper end surface of the casing 4 by not-graphically-shown bolts. The upper and lower portions of the electric motor shaft 1 are rotatably supported on the cover 5 and the lower portion of the casing 4 via bearings 6 and 7, respectively.

The stator 3 includes a stator core 8 constituted of electromagnetic steel plates laminated one over another and a stator coil 9 wound around the stator core 8 vertically (in the electric-motor axial direction shaft: hereinafter, it may be called as the electric-motor axial direction). The stator coil 9 includes a pair of coil ends 9a which are respective upper and lower folded portions of the stator coil 9. The stator coil 9 is wound in a state that the coil ends 9a protrude in the electric-motor axial direction beyond respective axial end surfaces of the stator core 8.

The stator 3 is inserted into the casing 4 after the coil is wounded. The casing 4 is covered with an upper die so as to be used as a receiving die (a lower die). Through the upper die, a sealant 10 is injected into the casing 4 to fill the casing 4. The sealant 10 is composed of, for example, synthetic resin material such as unsaturated polyester resin having an electric insulation property and a thermal conductivity. The sealant 10 is thus provided so as to cover the entirety of the stator 3 or a part of the stator, the part including the coil ends 9a, to enhance the thermal conductivity from the stator 3 to the casing 4 (see patent literature 1). The sealant 10 is injected with a certain pressure which allows the sealant to be securely infiltrated into a portion required to be sealed, such as a space between the stator coils.

To the coil ends 9a in the electric motor is connected a not-graphically-shown lead wire for interconnecting an external wiring and the stator coil 9. The lead wire is drawn out through a through-hole formed in the peripheral wall of the casing, connected to a terminal block provided in the outer peripheral wall of the casing. As a structure for drawing out the lead wire, generally known is one disclosed in patent literature 2. The structure includes a seal member (a grommet) filled in the through-hole. The seal member surrounds a lead-wire insertion hole located in the center thereof, and the lead wire is drawn through the lead-wire insertion hole.

The above structure, however, has a possibility of allowing the sealant 10 injected into the casing 4 to leak out through the lead-wire insertion hole of the seal member or through the gap between the seal member and the circumferential surface of the through-hole, due to an injection pressure (a fluid pressure). The leakage of sealant reduces the injection pressure to deteriorate the stator sealing effect. Besides, the leaked sealant may intrude into the terminal block to deteriorate the electric insulation property.

CITATION LIST

Patent Literature

Patent literature 1: Japanese Unexamined Patent Publication No. 2002-125337
Patent literature 2: Japanese Unexamined Patent Publication No. 2002-165405

SUMMARY OF INVENTION

An object of the invention is to provide an electric motor assembly capable of preventing a sealant to be injected for manufacturing an electric motor from leakage through a lead wire drawing portion, and an electric motor manufacturing method with use of the electric motor assembly.

An electric motor assembly according to the invention comprises: an electric motor shaft; a rotor which is rotated about the electric motor shaft; a stator disposed around the rotor and including a pair of coil ends which are respective ends in an axial direction of the electric motor shaft; a casing which accommodates the rotor and the stator and allows a sealant composed of a synthetic resin material having a thermal conductivity and an electric insulation property to be injected into the casing in a state that the sealant covers at least the coil ends; a lead wire connected to at least one of the coil ends of the stator and including a portion to be drawn to an outside of the casing; a partition wall which separates a sealant space into which the sealant is to be injected from a non-sealant space into which the sealant is not to be injected, the partition wall being formed with a through-hole penetrating through the partition wall so as to bring the sealant space and the non-sealant space into communication with each other; and a plug to be attached to the partition wall so as to close the through-hole. The plug is made of a material having elasticity higher than elasticity of a material composing the casing. The plug includes an outer peripheral surface tapered from a side of the sealant space toward a side of the non-sealant space and has a tubular shape surrounding a lead-wire insertion hole located in a center of the plug. The plug is fitted into the through-hole so as to bring the outer peripheral surface of the plug into contact with an inner peripheral surface of the partition wall, the inner peripheral surface surrounding the through-hole, in a state that the lead wire is drawn through the lead-wire insertion hole and one end of both ends of the plug, the one end having a larger diameter of the outer peripheral surface, is located on the side of the sealant space.

An electric motor manufacturing method provided by the invention comprises: a step of preparing an electric motor assembly including: an electric motor shaft; a rotor which is rotated about the electric motor shaft; a stator disposed around the rotor and including a pair of coil ends which are respective ends in an axial direction of the electric motor shaft; a casing which accommodates the rotor and the stator; a lead wire connected to at least one of the coil ends of the stator and including a portion to be drawn to an outside of the casing; a partition wall which separates a sealant space into which the sealant is to be injected from a non-sealant space into which the sealant is not to be injected, the partition wall being formed with a through-hole penetrating through the partition wall so as to bring the sealant space and the non-sealant space into communication with each other; and a plug to be attached to the partition wall so as to close the through-hole, the plug being made of a material having elasticity higher than elasticity of a material composing the casing, the plug including an outer peripheral surface tapered from a side of the sealant space toward a side of the non-sealant space and having a tubular shape surrounding a lead-wire insertion hole located in a center of the plug, the plug configured to be fitted into the through-hole so as to bring the outer peripheral surface of the plug into contact with an inner peripheral surface of the partition wall, the inner peripheral surface surrounding the through-hole, in a state that the lead wire is drawn through the lead-wire insertion hole and one end of both ends of the plug, the one end having a larger diameter of the outer peripheral surface, is located on the side of the sealant space; and a step of injecting the sealant composed of a synthetic resin material having a thermal conductivity and a electric insulation property into the casing of the electric motor assembly in a state that the sealant covers at least the coil ends and pressing the plug outwardly by an injection pressure of the sealant to thereby press the tapered outer peripheral surface of the plug against the inner peripheral surface of the partition wall surrounding the through-hole.

DESCRIPTION OF EMBODIMENTS

Described are embodiments of the invention with reference to FIG. 1 to FIG. 5. The embodiments relates to an electric motor installed in a vertical posture like the electric motor illustrated in FIG. 6.

Figure 1:
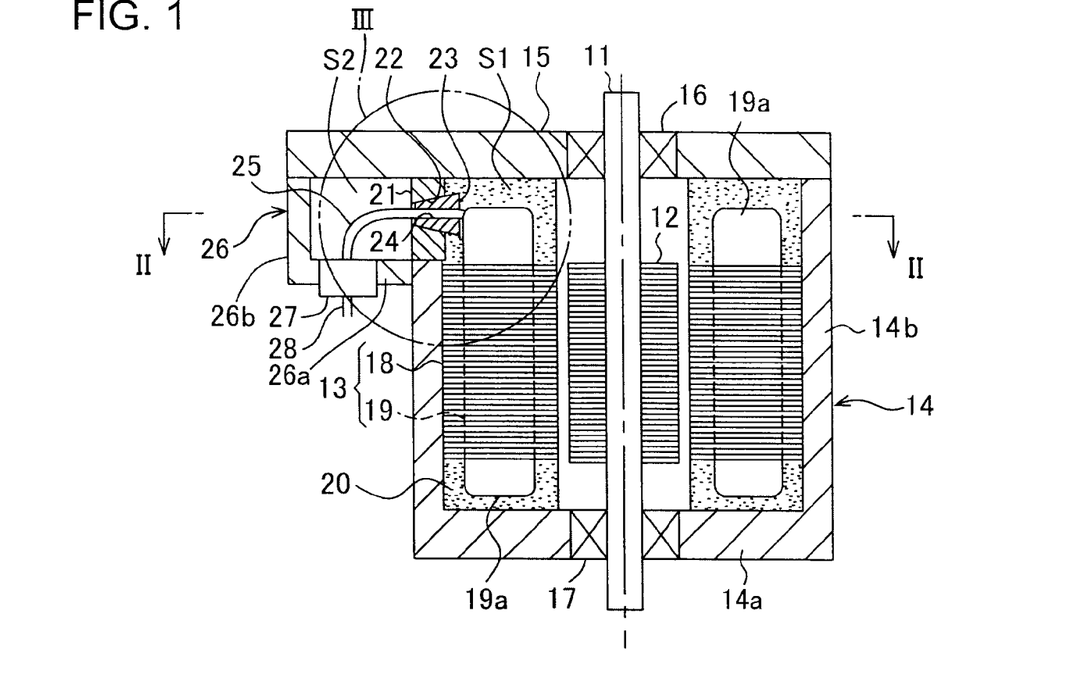
FIG. 1 is a cross-sectional view of an electric motor according to the first embodiment of the invention.
Figure 2:
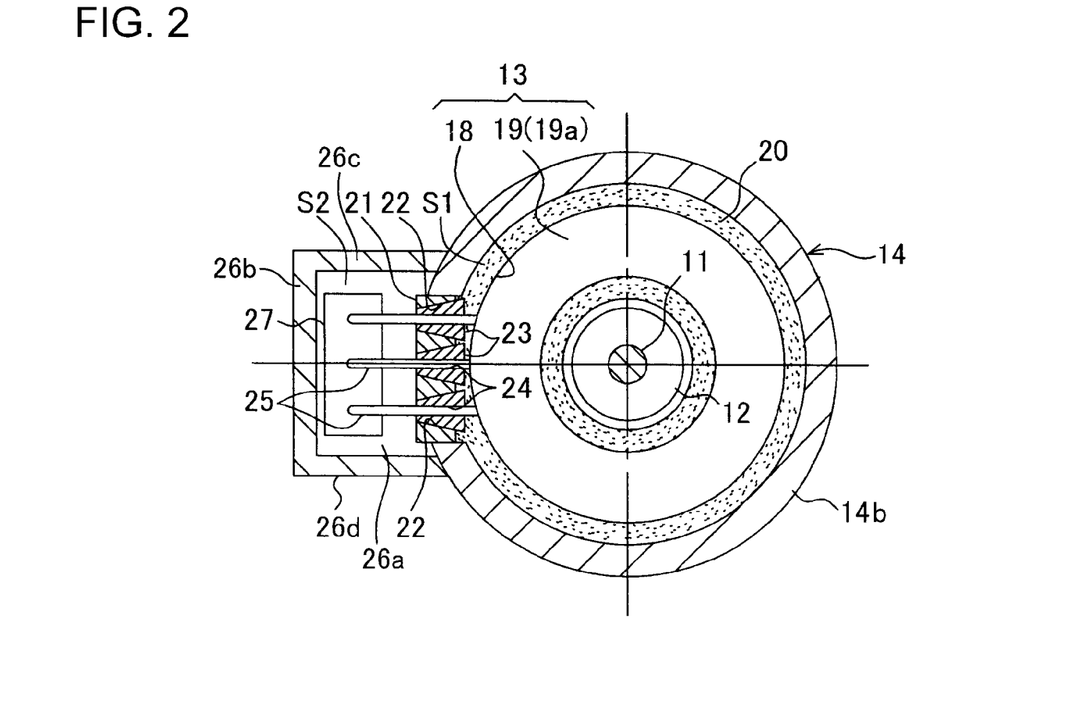
FIG. 2 is a sectional view taken along the line II-II in FIG. 1.
Figure 5:
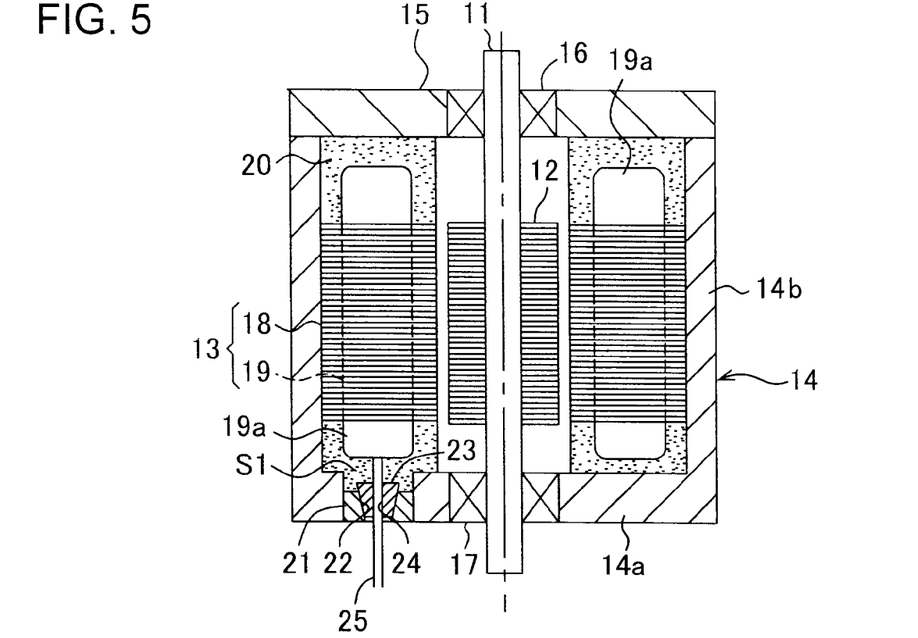
FIG. 5 is a cross-sectional view of an electric motor according to the second embodiment of the invention.

Specifically, the electric motor according to each of the embodiments is manufactured by injecting a sealant 20 into an electric motor assembly. The electric motor assembly includes an electric motor shaft 11, a rotor 12 which is rotated about the electric motor shaft 11, a stator 13 disposed around the rotor 12, a casing 14 which accommodates the rotor 12 and the stator 13, and a cover 15 to be mounted on one axial end of the casing 14. The casing 14 includes a bottom wall 14a and a peripheral wall 14b located on the upper side of the bottom wall 14a and joined to the perimeter of the bottom wall 14a. The cover 15 is mounted on the upper end surface of the casing 14 by not-graphically-shown bolts. The upper and lower portions of the electric motor shaft 11 are rotatably supported on the cover 15 and the lower portion of the casing 14 via bearings 16 and 17, respectively. The stator 13 includes a stator core 18 constituted of electromagnetic steel plates laminated one over another and a stator coil 19 wound around the stator core 18 vertically. The stator coil 19 includes a pair of coil ends 19a which are respective upper and lower folded portions of the electric motor shaft 11, that is, both ends of the stator coil 19 in the electric-motor axial direction shaft 11. The coil ends 19a are wound in a state that the coil ends 19a protrude in the electric-motor axial direction beyond respective axial ends of the stator core 18. The entire stator 13 or a part of the stator 13 including the coil ends 19a is covered with a sealant 20 composed of synthetic resin, such as unsaturated polyester resin, having an electric insulation property and a thermal conductivity.

Next will be described the features of the first embodiment with reference to FIG. 1 to FIG. 4.

The electric motor assembly according to the first embodiment further includes a partition wall 21, a plurality of plugs 23, a plurality of lead wires 25, and a terminal block 27.

The partition wall 21 is formed into a thick rectangular plate shape of a highly elastic material such as silicon rubber, in other words, a material having an elasticity at least higher than the elasticity of the material composing the casing 14. The partition wall 21 is provided in the upper portion of the peripheral wall 14b of the casing 14. Specifically, the upper portion of the peripheral wall 14b is partially cut away, and the partition wall 21 is disposed so as to fill the cutaway portion and so as to separate a sealant space S1 into which the sealant 20 is injected, i.e., the space inside the casing 14, from a non-sealant space into which the sealant 20 is not injected, i.e., the space outside the casing 14.

The partition wall 21 is provided with one or more through-holes 22. In the example shown in FIG. 2 and FIG. 4, three through-holes 22 are formed in the vertical center portion of the partition wall 21 while horizontally spaced. Each of the through-holes 22 is a taper hole tapered from the sealant space S1 side toward the non-sealant space side and closed by each of the plugs 23. Each of the plugs 23 is formed of a highly elastic material such as silicon rubber similarly to the partition wall 21 into a taper shape (a conical trapezoidal shape) tapered from the sealant space S1 side toward the non-sealant space side with the same taper angle as that of the through-hole 22 and into a tubular shape surrounding a lead-wire insertion hole 24 formed in the center of the plug 23. The lead wires 25 are connected to the upper-side coil end 19a and drawn to the outside of the plugs 23 through the lead-wire insertion holes 24 of the plugs 23.

The terminal block 27, configured to interconnect the lead wires 25 and an external wiring 28, is supported on a terminal block support portion 26 formed in the upper portion of the casing 14. The terminal block support portion 26 is disposed outside the partition wall 21 and has a shape surrounding a hollow portion S2, which is the non-sealant space. The terminal block support portion 26 according to the embodiment includes a bottom wall 26a, an outer wall 26b, a left wall 26c, and a right wall 26d, which are located on the lower side, the outer side, the left side, and the right side of the hollow portion S2, respectively: the terminal block 27 is mounted on the bottom wall 26a of the terminal block support portion 26. The terminal block support portion 26, thus, supports the terminal block 27 so as to form define the hollow portion S2 between the partition wall 21 and the terminal block 27.

The electric motor according to the embodiment is manufactured as follows.

(1) The stator coil 19 is wound around the stator core 18, whereby the stator 13 is formed. The stator 13 is inserted, at a predetermined position, into the casing 14 on which the partition wall 21 has been mounted in advance.

Figure 3A:
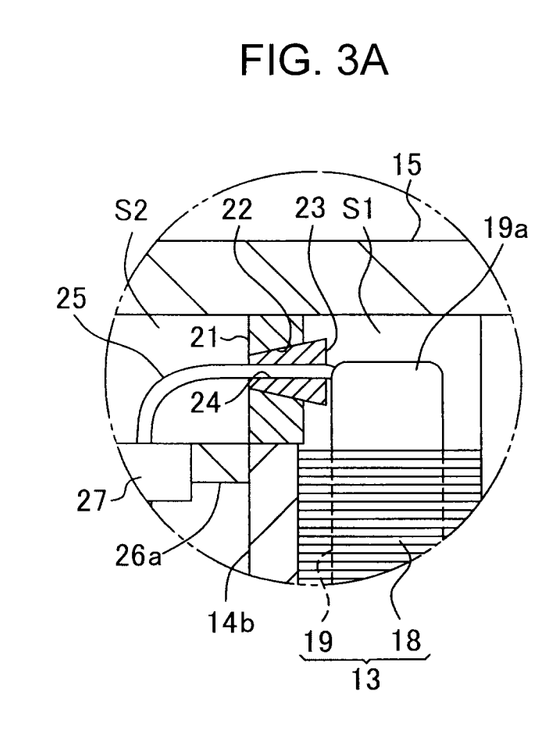
FIG. 3A is an enlarged view of a portion surrounded by the circle III in FIG. 1, and is a sectional view showing a state before a sealant is injected.

(2) As shown in FIG. 3A, the plugs 23 are fitted into respective through-holes 22 in the partition wall 21 in a state that the lead wires 25 are drawn through the lead-wire insertion holes 24 in the plugs 23.

Figure 3B:
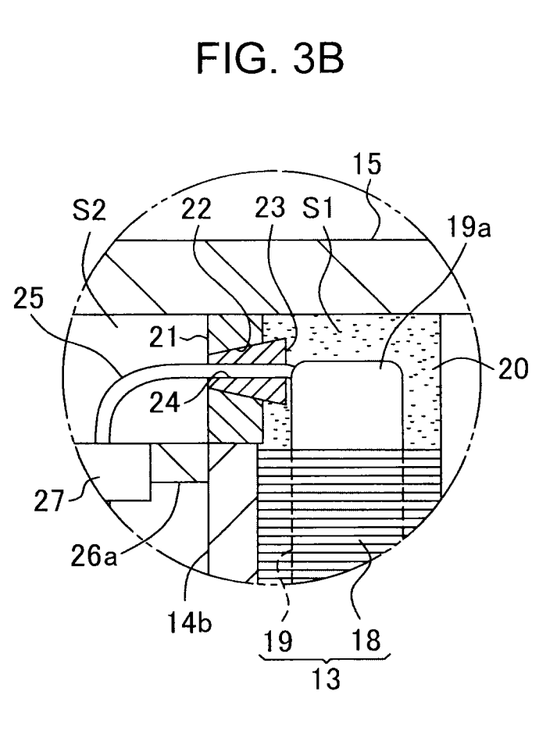
FIG. 3B is an enlarged view of the portion, and is a sectional view showing a state after the sealant is injected.
Figure 4:
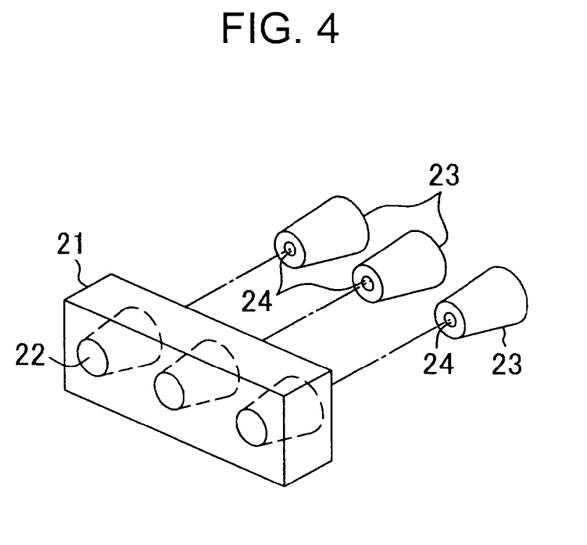
FIG. 4 is a perspective view showing a partition wall and plugs of the electric motor.

(3) An upper die, namely, an injection die, is set on the upper surface of the casing 14, and, as shown in FIG. 3B, the sealant 20 is injected from the upper die into the casing 14 as the lower die. During the injection, the tapered outer peripheral surfaces of the plugs 23 are pressed against the tapered inner peripheral surfaces (the inner peripheral surface of the partition wall 21) surrounding the through-holes 22 from the inside of the casing 14 toward the outside of the casing 14 by an injection pressure (a fluid pressure) of the sealant 20. This brings the outer peripheral surfaces into close contact with the inner peripheral surfaces, while the plugs 23 are elastically deformed in a diameter-reduction direction by the counterforce exerted from the inner peripheral surfaces to thereby close respective lead-wire insertion holes 24. Specifically, each of the plugs 23 closes the clearance between the inner peripheral surface of the plugs 23 surrounding the lead-wire insertion hole 24 and the lead wires 25. The sealant 20 is thereby prevented from leakage to the outside of the casing 14 through the clearance. In this case, the following matters permits the sealant leakage prevention effect to be further enhanced:

A) respective elastic resilient forces of both of the plugs 23 and the partition wall 21 act as forces which bring the outer peripheral surfaces of the plugs 23 and the inner peripheral surfaces of the partition wall 21 surrounding the respective through-holes 22 into close contact with each other and as forces which close the inner clearance of the lead-wire insertion holes 24; and B) the outer peripheral surfaces and the inner peripheral surface are formed as respective tapered surfaces corresponding to each other, so that a close contact force between the tapered surfaces and a force of reducing the diameter of the plugs 23 act over the entire length of the plugs 23.

On the other hand, the hollow portion S2 which is an air layer having a high electric insulation property is secured between the lead wire drawing portion through which the lead wires 25 are drawn to the outside of the casing 14, and the terminal block 27; therefore, even if the sealant 20 leaks in the initial stage of injecting the sealant, leaked sealant is securely prevented from arriving at the terminal block 27 to deteriorate the electric insulation property.

Next will be described the features of the second embodiment of the invention with reference to FIG. 5. In other words, there will be described a difference between the second embodiment and the first embodiment.

In the second embodiment, cut away is not a peripheral wall 14b of a casing 14 but a part of a bottom wall 14a. The cutaway portion is provided with a partition wall 21 having a through-hole 22, into which a plug 23 is fitted. A lead wire 25 connected to a lower-side coil end 19a is drawn to the outside of the casing 14 through a lead-wire insertion hole 24 formed in the plug 23 to be connected to a terminal block which is not shown in FIG. 5. The second embodiment is substantially the same as the first embodiment in the following points: that the partition wall 21 and the plug 23 are made of a highly elastic material such as silicon rubber; and that the through-hole 22 and the plug 23 are tapered from a sealant space S1 toward a non-sealant space, i.e., toward the outer space of the casing 14.

As well as the first embodiment, the second embodiment provides substantially the basic effect, that is, the effect of pressing the plug 23 outwardly by the injection pressure of the sealant 20 to bring the outer peripheral surface of the plug 23 into close contact with the inner peripheral surface of the partition wall 21 surrounding the through-hole 22 and closing the inner clearance of the lead-wire insertion hole 24, thereby preventing the sealant 20 from leakage from the casing 14 through the lead wire drawing portion.

The invention is not limited to the first and second embodiments but allowed to include the following modifications.

(i) According to the invention, the partition wall 21 may have a through-hole 22 which is a straight one having a uniform diameter over the entire length thereof, allowing a plug 23 having a tapered outer peripheral surface to be fitted into the through-hole 22.

(ii) It is also permitted that the partition wall 21 is made of a material substantially devoid of elasticity or having a low elasticity, e.g., metal, and the plug 23 is elastically deformed in a diameter-reduction direction by an injection pressure of a sealant merely due to only the elasticity of the plug 23 itself. For instance, a part of the peripheral wall of a casing 14 may form a partition wall, to which a through-hole 22 is provided.

(iii) The invention is not limited to an electric motor installed in a vertical posture; it may be also applied to manufacture of an electric motor installed in a horizontal posture, or a generator or a generator-motor based on the same principle as applied to the electric motors of the embodiments, as described above.

As described above, the invention provides an electric motor assembly capable of preventing a sealant to be injected for manufacturing an electric motor from leakage through a lead-wire drawing portion, and an electric motor manufacturing method with use of the electric motor assembly.

An electric motor assembly according to the invention comprises: an electric motor shaft; a rotor which is rotated about the electric motor shaft; a stator disposed around the rotor and including a pair of coil ends which are respective ends in an axial direction of the electric motor shaft; a casing which accommodates the rotor and the stator and allows a sealant composed of a synthetic resin material having a thermal conductivity and an electric insulation property to be injected into the casing in a state that the sealant covers at least the coil ends; a lead wire connected to at least one of the coil ends of the stator and including a portion to be drawn to an outside of the casing; a partition wall which separates a sealant space into which the sealant is to be injected from a non-sealant space into which the sealant is not to be injected, the partition wall being formed with a through-hole penetrating through the partition wall so as to bring the sealant space and the non-sealant space into communication with each other; and a plug to be attached to the partition wall so as to close the through-hole. The plug is made of a material having elasticity higher than elasticity of a material composing the casing. The plug includes an outer peripheral surface tapered from a side of the sealant space toward a side of the non-sealant space and has a tubular shape surrounding a lead-wire insertion hole located in a center of the plug. The plug is fitted into the through-hole so as to bring the outer peripheral surface of the plug into contact with an inner peripheral surface of the partition wall, the inner peripheral surface surrounding the through-hole, in a state that the lead wire is drawn through the lead-wire insertion hole and one end of both ends of the plug, the one end having a larger diameter of the outer peripheral surface, is located on the side of the sealant space.

Further, an electric motor manufacturing method provided by the invention comprises: a step of preparing an electric motor assembly including: an electric motor shaft; a rotor which is rotated about the electric motor shaft; a stator disposed around the rotor and including a pair of coil ends which are respective ends in an axial direction of the electric motor shaft; a casing which accommodates the rotor and the stator; a lead wire connected to at least one of the coil ends of the stator and including a portion to be drawn to an outside of the casing; a partition wall which separates a sealant space into which the sealant is to be injected from a non-sealant space into which the sealant is not to be injected, the partition wall being formed with a through-hole penetrating through the partition wall so as to bring the sealant space and the non-sealant space into communication with each other; and a plug to be attached to the partition wall so as to close the through-hole, the plug being made of a material having elasticity higher than elasticity of a material composing the casing, the plug including an outer peripheral surface tapered from a side of the sealant space toward a side of the non-sealant space and having a tubular shape surrounding a lead-wire insertion hole located in a center of the plug, the plug configured to be fitted into the through-hole so as to bring the outer peripheral surface of the plug into contact with an inner peripheral surface of the partition wall, the inner peripheral surface surrounding the through-hole, in a state that the lead wire is drawn through the lead-wire insertion hole and one end of both ends of the plug, the one end having a larger diameter of the outer peripheral surface, is located on the side of the sealant space; and a step of injecting the sealant composed of a synthetic resin material having a thermal conductivity and an electric insulation property into the casing of the electric motor assembly in a state that the sealant covers at least the coil ends and pressing the plug outwardly by an injection pressure of the sealant to thereby press the tapered outer peripheral surface of the plug against the inner peripheral surface of the partition wall surrounding the through-hole.

According to the electric motor assembly and the electric motor manufacturing method using the same, the plug fitted into the through-hole is pressed outwardly by the injection pressure of the sealant to thereby bring the tapered outer peripheral surface thereof into close contact with the inner peripheral surface surrounding the through-hole, while a counterforce exerted on the plug by the inner peripheral surface elastically deforms the plug in a diameter-reduction direction thereof to thereby cause the plug to close the inner clearance of the lead-wire insertion hole, i.e., the clearance between the inner peripheral surface of the plug surrounding the lead-wire insertion hole and the lead wire. This allows the sealant to be prevented from leakage through the lead wire drawing portion.

In the electric motor assembly according to the invention, the partition wall is preferably made of a material having an elasticity higher than the elasticity of the material composing the casing. The high elasticity of the material composing the partition wall, in cooperation with the elasticity of the material composing the plug, enhances the close contact force for bringing the outer peripheral surface of the plug into contact with the inner peripheral surface of the partition wall surrounding the through-hole and enhances the force by which the plug closes the lead-wire insertion hole, thereby enhancing the sealant leakage prevention effect.

In the electric motor assembly according to the invention, it is preferable that the inner peripheral surface of the partition wall surrounding the through-hole is tapered from the side of the sealant space toward the side of the non-sealant space so as to correspond to the outer peripheral surface of the plug. The shape of the inner peripheral surface allows the close contact force and the force which compresses the plug in the diameter-reduction direction thereof to act over the entire length of the plug, thereby enabling the sealant leakage prevention effect to be further enhanced.

As to the electric motor assembly according to the invention, in the case where the casing includes a bottom wall and a peripheral wall located on the upper side of the bottom wall and joined to the perimeter of the bottom wall, the partition wall may be provided to the bottom wall or may be provided to the peripheral wall. In the latter configuration, it is preferable that the electric motor assembly further includes a terminal block which interconnects the lead wire and an external wiring and a terminal block support portion provided outside the partition wall, the terminal block support portion supporting the terminal block so as to define a hollow portion, which constitutes the non-sealant space, between the partition wall and the terminal block. Thus interposing the hollow portion between the partition wall as a lead-wire drawing portion and the terminal block, that is, interposing an air layer having a high electric insulation property, allows leaked sealant to be more reliably prevented from arriving at the terminal block to deteriorate the electric insulation property, even if the sealant had leaked out through the lead-wire drawing portion in the initial stage of injecting.

The invention claimed is:
1. An electric motor assembly for configuring an electric motor, comprising:
   an electric motor shaft;
   a rotor which is rotated about the electric motor shaft;
   a stator disposed around the rotor and including a pair of coil ends which are respective ends in an axial direction of the electric motor shaft;
   a casing which accommodates the rotor and the stator and allows a sealant composed of a synthetic resin material having a thermal conductivity and an electric insulation property to be injected into the casing in a state that the sealant covers at least the coil ends;
   a lead wire connected to at least one of the coil ends of the stator and including a portion to be drawn to an outside of the casing;
   a partition wall which separates a sealant space into which the sealant is to be injected from a non-sealant space into which the sealant is not to be injected, the partition wall being formed with a through-hole penetrating through the partition wall so as to bring the sealant space and the non-sealant space into communication with each other; and
   a plug to be attached to the partition wall so as to close the through-hole, wherein:
   the plug is made of a material having elasticity higher than elasticity of a material composing the casing;
   the plug includes one end located at the side of the sealant space and another end at the side of the non-sealant space, the plug further includes an outer peripheral surface tapered from a side of the sealant space toward a side of the non-sealant space and has a tubular shape surrounding a lead-wire insertion hole located in a center of the plug; and the plug is fitted into the through-hole so as to bring the outer peripheral surface of the plug into contact with an inner peripheral surface of the partition wall, the inner peripheral surface surrounding the through-hole, in a state that the lead wire is drawn through the lead-wire insertion hole and the one end of the plug, the one end having a larger diameter of the outer peripheral surface, is located on the side of the sealant space, the one end of the plug has a sealant end surface located away from the stator so as to allow the sealant end surface to be pressed outwardly by an injection pressure of the sealant to thereby bring the outer peripheral surface of the plug into close contact with the inner peripheral surface of the partition wall.

2. The electric motor assembly according to claim 1, wherein the partition wall is made of a material having elasticity higher than the elasticity of the material composing the casing.

3. The electric motor assembly according to claim 1, wherein the inner peripheral surface of the partition wall surrounding the through-hole is tapered from the side of the sealant space toward the side of the non-sealant space so as to correspond to the outer peripheral surface of the plug.

4. The electric motor assembly according claim 1, wherein the casing includes a bottom wall and a peripheral wall located on the upper side of the bottom wall and joined to the perimeter of the bottom wall, the partition wall being provided to the peripheral wall, and the electric motor assembly further includes a terminal block which interconnects the lead wire and an external wiring and a terminal block support portion provided outside the partition wall, the terminal block support portion supporting the terminal block so as to define a hollow portion, which constitutes the non-sealant space, between the partition wall and the terminal block.

5. A method for manufacturing an electric motor, comprising:

a step of preparing an electric motor assembly including an electric motor shaft, a rotor which is rotated about the electric motor shaft, a stator disposed around the rotor and including a pair of coil ends which are respective ends in an axial direction of the electric motor shaft, a casing which accommodates the rotor and the stator, a lead wire connected to at least one of the coil ends of the stator and including a portion to be drawn to an outside of the casing, a partition wall which separates a sealant space into which a sealant is to be injected from a non-sealant space into which the sealant is not to be injected, the partition wall being formed with a through-hole penetrating through the partition wall so as to bring the sealant space and the non-sealant space into communication with each other, and a plug to be attached to the partition wall so as to close the through-hole, the plug being made of a material having elasticity higher than elasticity of a material composing the casing, the plug including an outer peripheral surface tapered from one end at a side of the sealant space toward another end at a side of the non-sealant space and having a tubular shape surrounding a lead-wire insertion hole located in a center of the plug, the plug configured to be fitted into the through-hole so as to bring the outer peripheral surface of the plug into contact with an inner peripheral surface of the partition wall, the inner peripheral surface surrounding the through-hole, in a state that the lead wire is drawn through the lead-wire insertion hole and one end of both ends of the plug, the one end having a larger diameter of the outer peripheral surface, is located on the side of the sealant space; and a step of injecting the sealant composed of a synthetic resin material having a thermal conductivity and an electric insulation property into the casing of the electric motor assembly in a state that the sealant covers at least the coil ends and pressing the plug inserted into the through-hole outwardly by an injection pressure of the sealant to thereby press the tapered outer peripheral surface of the plug against the inner peripheral surface of the partition wall surrounding the through-hole.

* * * * *